(12) United States Patent
Aumasson et al.

(10) Patent No.: US 9,131,113 B2
(45) Date of Patent: Sep. 8, 2015

(54) METHOD FOR CREATING AN ENHANDED DATA STREAM

(75) Inventors: Jean-Philippe Aumasson, Vuibroye (CH); Christian Schwarz, Vuarrens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 298 days.

(21) Appl. No.: 13/286,536

(22) Filed: Nov. 1, 2011

(65) Prior Publication Data

US 2012/0106741 A1   May 3, 2012

Related U.S. Application Data

(60) Provisional application No. 61/409,550, filed on Nov. 3, 2010.

(30) Foreign Application Priority Data

Nov. 1, 2010 (EP) .................................... 10189587

(51) Int. Cl.
| | |
|---|---|
| H04L 29/06 | (2006.01) |
| H04N 7/167 | (2011.01) |
| H04N 21/2347 | (2011.01) |
| H04N 21/236 | (2011.01) |
| H04N 21/2389 | (2011.01) |
| H04N 21/4385 | (2011.01) |

(52) U.S. Cl.
CPC ........... *H04N 7/167* (2013.01); *H04N 21/2347* (2013.01); *H04N 21/2389* (2013.01); *H04N 21/23611* (2013.01); *H04N 21/23895* (2013.01); *H04N 21/4385* (2013.01)

(58) Field of Classification Search
USPC .......................................................... 380/277
See application file for complete search history.

(56) References Cited

U.S. PATENT DOCUMENTS 5,432,853 A * 7/1995 Yamamoto ...................... 380/46
6,226,291 B1   5/2001 Chauvel et al.
(Continued)

FOREIGN PATENT DOCUMENTS

| EP | 2 058 982 | 5/2009 |
|---|---|---|
| WO | WO 99/55052 | 10/1999 |

OTHER PUBLICATIONS

Qian, Lijun, Ning Song, and Xiangfang Li. "Detection of wormhole attacks in multi-path routed wireless ad hoc networks: a statistical analysis approach." Journal of Network and Computer Applications 30.1 (2007): 308-330.*

(Continued)

*Primary Examiner* — Harris C Wang
(74) *Attorney, Agent, or Firm* — DLA Piper LLP US

(57) ABSTRACT

The present invention provides a method for secure communication of digital information between a transmission entity and at least one reception entity. The method may be applied in the domain of audio/video data transmission, where stuffing data packets comprising random payloads are inserted into a transport stream along with true data packets comprising the audio/video data. The dummy data packets are detectable by an authorized reception entity but not detectable by unauthorized reception entities. A large number of stuffing data packets are included in the transmission to occupy bandwidth and to further render the job difficult for an unauthorized reception entity which tries to intercept the transmission.

11 Claims, 1 Drawing Sheet

(56) References Cited

U.S. PATENT DOCUMENTS

| | | | |
|---|---|---|---|
| 6,839,532 B2 | 1/2005 | Hoashi | |
| 8,752,156 B1* | 6/2014 | van Dijk et al. | 726/9 |
| 2002/0154631 A1* | 10/2002 | Makansi et al. | 370/389 |
| 2003/0133446 A1* | 7/2003 | Schoenblum | 370/356 |
| 2003/0204728 A1* | 10/2003 | Irwin | 713/176 |
| 2004/0247130 A1* | 12/2004 | Koike | 380/277 |
| 2005/0021817 A1* | 1/2005 | Shimizu et al. | 709/231 |
| 2005/0262573 A1* | 11/2005 | Bo et al. | 726/27 |
| 2006/0176909 A1 | 8/2006 | Strasser | |
| 2008/0259800 A1* | 10/2008 | Clark et al. | 370/235 |
| 2009/0141899 A1* | 6/2009 | Huang et al. | 380/270 |
| 2009/0172171 A1 | 7/2009 | Amir | |
| 2010/0040030 A1 | 2/2010 | Kakumaru | |
| 2012/0051539 A1* | 3/2012 | Kar et al. | 380/200 |
| 2012/0106741 A1* | 5/2012 | Aumasson et al. | 380/277 |

OTHER PUBLICATIONS

Avrim Blum et al., "Noise-Tolerant Learning, the Parity Problem, and the Statistical Query Model", Journal of the ACM, vol. 50, No. 4, pp. 506-519 (Jul. 2003).

Oded Regev, "On Lattices, Learning with Errors, Random Linear Codes, and Cryptography", STOC'05. pp. 84-93, (May 2005).

European Search Report issued in EP 10 18 9587, dated Feb. 14, 2011.

Xinwen Fu et al., "On Effectiveness of Link Padding fro Statistical Traffic Analysis Attacks", Proceedings of the 23rd International Conference on Distributed Computing Systems (ICDCS'03). pp. 340-347 (May 2003).

Shu Jiang et al., "Preventing Traffic Analysis in Packet Radio Networks", Proceedings of the Darpa Information Survivabilty Conference & Exposition II, pp. 153-158 (Jun. 2001).

* cited by examiner

METHOD FOR CREATING AN ENHANDED DATA STREAM

CROSS REFERENCE TO RELATED APPLICATIONS

This application claims the benefit of U.S. Provisional Application No. 61/409,550, filed Nov. 3, 2010, the entire contents of which are hereby incorporated by reference herein and of European Application No. 10189587.8, filed Nov. 1, 2010, the entire contents of which are hereby incorporated by reference herein.

This application hereby incorporates by reference herein the entire contents of pages 84-93 from the Proceedings of the thirty-seventh annual ACM symposium on Theory of computing (Baltimore, Md., USA: ACM, 2005), entitled "On lattices, learning with errors, random linear codes, and cryptography," by Oded Regev.

INTRODUCTION

The present invention relates to the transmission of digital information between electronic devices, particularly in the domain of digital multimedia communication, where such digital information is subject to conditional access constraints.

STATE OF THE ART

As it is well known in the domain of digital multimedia data transmission, and especially in the transmission of audio/video digital information, such information is generally transmitted as part of a transport stream. A transport stream is made up of data packets, each data packet comprising a plurality of bits of information. Transport streams in the field of digital multimedia communication generally adhere to an MPEG format such as MPEG-2.

U.S. Pat. No. 6,226,291 B1 discloses a transport stream being made up of a number of data packets and gives details of the construction of a data packet. The data packet comprises two parts, namely a header and a payload. In general, for a data packet length of l bits, l is greater than or equal to 2. Of those l bits, the header comprises n bits, where n is greater than or equal to 1 and the payload comprises the remaining l minus n bits. In the aforementioned publication, the data packet is 188 bytes long, 4 bytes (32 bits) of which comprise the header, with the remaining 184 bytes comprising the payload. These are generally accepted values within the state of the art. The actual useful digital information forming the object of the communication is comprised within the payload. The header on the other hand comprises meta-information, an example of which is a packet identifier (PID).

Different types of data packets are known in the domain of concern, including content packets and stuffing packets. Content packets, or more particularly the payloads of the content packets, comprise the actual digital information to be transmitted, whereas the stuffing packets comprise dummy information not necessarily related to the actual audio/video content. By actual digital information to be transmitted it is understood to include portions of programming (i.e. audio/video content), system information and/or other related information. The use of stuffing packets is known within the industry and is described in United States Patent Application Publication number 2003/0133446 A1, where they are used in a broadband packet-switching network environment to enable the reconstruction of a synchronous transport stream from a received asynchronous transport stream, the stuffing packets serving as markers to reserve space where content packets will be inserted once they are received.

Insomuch as the multimedia data transmission may comprise content of commercial value, distributors of such multimedia data, such as PayTV operators for example, generally transmit the data in encrypted format. In order to be able to decrypt the data at a receiving end, a user equipped with an appropriate multimedia reception module comprising a conditional access module is required to obtain appropriate authorization to decrypt the data, usually through the purchase of necessary rights from the operator. The multimedia reception module works together with a security module in which the rights are stored, as well as any necessary decryption keys and other such secure information. The security module is usually detachable and portable and generally takes the form of a chip housed on a credit card sized device. United States Patent Application Publication number 2006/0176909 A1 gives a background to the use of such security modules in the domain of PayTV.

In spite of the security precautions employed in today's conditional access systems, it is still conceivably possible for a third party to intercept a communication between, say, a multimedia reception module and a security module. Even though the information thus intercepted may be in encrypted format, it may still be possible for a determined third party to obtain knowledge of the encryption algorithm and/or decryption keys and to be able to decrypt the intercepted information. In United States Patent Application Number 2009/0172171 A1, a method for disguising a flow of data packets in a communication session is disclosed. This method renders difficult the job of reconstruction of the transmission by an intercepting party. By disguised, in this context, it is meant that the communication session has one or more characteristics, including its origin or source, changed in order to avoid the identification thereof by an intercepting party. Use may be made of a plurality of different communication routes to complete a single communication, thereby making it more difficult for an intercepting party to reconstruct the communication.

BRIEF SUMMARY OF THE INVENTION

It is a goal of the present invention to provide a method for efficiently transmitting encrypted content in a transport stream, where the transport stream can be easily assembled by a transmission entity and easily disassembled by a legitimate or authorized reception entity while being practically infeasible to disassemble by a non-authorized device.

In order to achieve this goal, a computer based method for creating an enhanced data stream from a transmission stream comprising a plurality of standard data packets each having a header and a payload, said enhanced data stream comprising at least one stuffing enhanced packet and at least one content enhanced packet, the stuffing enhanced packet and the content enhanced packet each having an enhanced header and an enhanced payload, said method comprising:

generating the stuffing enhanced packet having an enhanced header and an enhanced payload, wherein the enhanced header is not distinguishable from a header of a standard data packet and wherein the enhanced payload includes a tag that identifies the packet as a stuffing enhanced packet;

generating a content enhanced packet comprising an enhanced header and an enhanced payload, wherein the enhanced header is not distinguishable from a header of a standard data packet and wherein the enhanced payload is based on at least the payload of a standard data packet and wherein the enhanced payload includes a tag that does not identify the packet as a stuffing enhanced packet; and creating the enhanced data stream by assembling the stuffing enhanced packet and the content enhanced packet.

Upon reception of a data stream assembled according to an embodiment of the present invention, a method is further provided for creating a transmission stream from an enhanced data stream comprising a plurality of enhanced packets including an enhanced payload, said transmission stream comprising a plurality of standard data packets, said method comprising assembling the transmission stream by selecting enhanced packets from the enhanced data stream for which at least part of the enhanced packet's enhanced payload corresponds to a value from a predetermined set of values.

The invention further provides for a device for creating an enhanced data stream from a transmission stream comprising a plurality of standard data packets each having a header and a payload, said enhanced data stream comprising at least one stuffing enhanced packet and at least one content enhanced packet, said device comprising:

an enhanced header generator to generate at least one first enhanced header and at least one second enhanced header;

a stuffing enhanced packet generator to generate the at least one stuffing enhanced packet, said stuffing enhanced packet comprising at least the first enhanced header and an enhanced payload;

a content enhanced packet generator to generate the at least one content enhanced packet, said content enhanced packet comprising at least the second enhanced header and an enhanced payload, said enhanced payload being based on at least the payload of a standard data packet;

an enhanced data stream assembler to assemble the enhanced data stream from the at least one stuffing enhanced packet and the at least one content enhanced packet to form the enhanced data stream;

said device characterized in that it further comprises:

a tag generator to generate:

at least one first tag for inclusion in the at least one stuffing enhanced packet, said inclusion allowing for the packet to be identified as a stuffing enhanced packet; and at least one second tag for inclusion in the at least one content enhanced packet, said inclusion allowing for the packet to be not identified as a stuffing enhanced packet;

said device being further characterized in that the enhanced header generator is configured such that the first and second enhanced headers are not distinguishable from each other. Such a device may be realized in many different ways as will be readily apparent to one of ordinary skill in the art. For example, in one embodiment, the device may comprise a single server (including a processor and computer memory) or multiple servers with appropriate instructions for performing the functions of the generator and assembler discussed above. Alternatively, some or all of the generators and assemblers may be dedicated hardware devices, which may comprise some combination of hardware, software and/or firmware.

The invention yet further provides for a device for extracting a transmission stream comprising a plurality of standard data packets each having a header and a payload from a received enhanced data stream, said enhanced data stream comprising at least one stuffing enhanced packet and at least one content enhanced packet, said device comprising:

a filter to select enhanced packets from the enhanced data stream, said enhanced packets being selectable by at least part of their enhanced payloads corresponding to a value from a predetermined set of values.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

An embodiment of the present invention may be deployed in a system comprising a first electronic device and a second electronic device connected together via a communication channel. The communication may be bi-directional in that, at a given time during a communication, either of the first electronic device or the second electronic device may function as a transmitter while the remaining electronic device functions as a receiver.

In such a system, a third party may attempt to intercept a transmission being made on the communication channel, such transmission intended to be kept secret from the third party. As is commonly practiced in the domain of digital multimedia communication, especially audio/video content transmission, where the content to be transmitted has commercial value, the content is generally transmitted in encrypted format. However, it is still possible for a determined third party to intercept the transmission. The third party may be able to decrypt the transmission and may then forward the decrypted transmission to other non-authorized parties. By way of example, the third party may intercept a transmission between a multimedia module or set top box and a removable security module.

Figure 1:
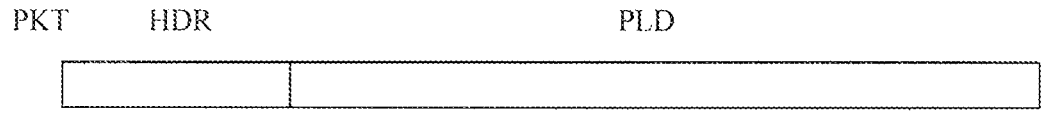
FIG. 1 showing a transport stream according to the state of the art.

FIG. 1 illustrates a data packet from a transport stream as is generally used in the state of the art to transmit audio/video content in MPEG format for example. The transport stream comprises a plurality of data packets each having a header and a payload.

Figure 2:
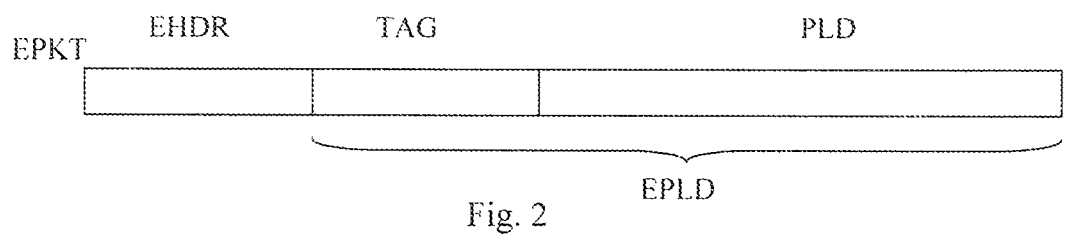
FIG. 2 showing a transport stream according to an embodiment of the present invention.

According to an embodiment of the present invention, digital information to be transmitted between a transmission entity and a reception entity is assembled, at the transmission entity, into a transport stream comprising enhanced packets. An enhanced packet comprising an enhanced header and an enhanced payload is shown in FIG. 2. The enhanced header is similar to the header of a standard content packet as generally used in the state of the art, and indeed is designed such that a non-authorized third party is unable to detect that it may not be the header of a standard content packet. The enhanced payload may be interpreted as having two parts: a tag and a payload. The tag is represented by the first b bits of the enhanced payload and the payload is represented by the remaining bits of the enhanced payload.

In another embodiment of the present invention, the total length of an enhanced packet is increased with respect to a standard data packet. In this embodiment the enhanced payload comprises an entire standard data packet embedded within it, i.e. the enhanced payload comprises the header and the payload of the standard data packet. In this case, the tag of the enhanced payload is represented by the header of the standard packet comprised within the enhanced payload and the payload of the enhanced payload is the entire payload of the standard data packet.

As is known in the state of the art, there exists (standard) content packets and (standard) stuffing packets. Similarly, according to embodiments of the present invention, where we speak of enhanced packets, there exists content enhanced packets and stuffing enhanced packets. Although, to a third party, the enhanced header of content enhanced packets and stuffing enhanced packets look, for all intents and purposes, the same as a header of a standard content packet, the structure of these headers may be defined as required by the particular application within the given constraint of appearing to be a standard header. These headers may therefore include such indicators as a timestamp, a serial number or a packet identifier for example.

As is the case with standard data packets, enhanced packets can be one of two types: content enhanced packets or stuffing enhanced packets. A content enhanced packet, i.e. an enhanced packet which is used to communicate a given valid content, comprises an enhanced header and an enhanced payload, where the enhanced payload comprises a tag (of b bits) and a payload, the payload being based on the payload of a standard content packet intended to communicate the same given valid content. According to one embodiment of the present invention, the tag is considered to be the first b bits of the enhanced payload. According to another embodiment, the tag is based on the header of a standard content packet intended to communicate the same given valid content. The term "based on" used here may also include "equal to". The tag may indeed even be any random b-bits as long as it does not coincide with a value of a stuffing enhanced packet, which will be described later. The total length of the content enhanced packet in this case is therefore longer than a standard data packet. According to different embodiments of the invention, the tag may be in encrypted format or in clear format. Similarly, the payload may be in encrypted or clear format. However, it is preferable for the tag and the payload to both be in encrypted format.

In the case that the enhanced packet is a stuffing enhanced packet, the enhanced payload comprises a tag and a payload. The tag is based on a code selected from a subset of codes and is preferably in encrypted form although in some embodiments it may be in clear. The payload may be based on a pseudo-random number or it may be based on a payload of an existing content enhanced packet or may be based on other information. The content of the payload is not important for a stuffing enhanced packet since such payloads will be ignored by authorized receivers. The main point is that the structures of stuffing enhanced packets and content enhanced packets must be such that they may not be differentiable by simple inspection.

It is worth noting at this point that although the terms enhanced packet, content enhanced packet, enhanced header, enhanced payload, tag and payload are used throughout this description, in actual practice within a system in which an embodiment of the present invention is deployed, an enhanced packet may look exactly the same as a standard data packet. For example, it could be that a content enhanced packet has an enhanced header which is identical to a header of a standard packet and a payload which is identical to the payload of a standard packet. The difference is that we refer to the payload as an enhanced payload for the purpose of describing the invention. In fact, we could equally refer to an enhanced packet having a header and a payload, of which the first b bits is a tag. In a content enhanced packet the tag plus the remainder of the enhanced payload is identical to the payload of an equivalent standard data packet which conveys the same content. In other words the content enhanced packet is identical to an equivalent standard data packet. In this case, the payload would be b-bits shorter than its equivalent payload in a standard packet. The stuffing enhanced packet will have a header similar to a standard data packet, a tag which is created at the transmission entity and the remainder of the enhanced payload being either random or copied data. It is also worth noting that the tag could be considered as part of the header rather than part of the payload. In some embodiments, the tag is placed between the header and the payload of a standard packet, but in other embodiments, the tag may be placed between fields of a standard header.

According to the invention, the enhanced packets are easy for a transmission entity to construct. Furthermore it is easy for a valid, or authorized, reception entity to detect which enhanced packets are content enhanced packets and which ones are stuffing enhanced packets. It is therefore easy for the authorized reception entity to efficiently discard the stuffing enhanced packets, even when the stuffing enhanced packets appear at unpredictable positions between the content enhanced packets within the transport stream. However, it is practically unfeasible for a non-authorized reception entity to tell the difference between content enhanced packets and stuffing enhanced packets and so in an endeavour not to lose what might be important data, the third party is obliged to attempt to treat all enhanced packets, thereby wasting processing time. Furthermore, even if the third party were to devise a means for processing all the transmitted data, he still would not be able to reconstruct the useful content.

By taking advantage of the opportunity afforded by the ability to efficiently construct stuffing enhanced packets and content enhanced packets by a transmission entity and the ability of a reception entity to efficiently recognise such packets, a very large number of stuffing enhanced packets can be included in a transport stream at unpredictable positions between the enhanced content packets. Indeed, according to the invention, the transport stream is transmitted across the data channel at a transmission rate which is largely increased with respect to the standard transmission rates used in the generally accepted transmission protocols in the industry, such as an MPEG format used within an IP network for example. Typically, a transmission of audio/video content in MPEG format between two components of a conditional access system, for example, would be made at a rate of 30-40 megabits per second. In a system in which an embodiment of the present invention is deployed, such a communication may be made at a rate of 500 megabits per second for example. This way, a maximum use of available bandwidth is possible, with stuffing enhanced packets being used to occupy bandwidth. As previously mentioned, the stuffing enhanced packets are unfeasibly difficult to recognise by an unauthorized reception entity or eavesdropper and so a potential eavesdropper is therefore led to try to intercept and process the entirety of the transport stream since he is unable to detect and reject stuffing packets. In order to do be able to intercept such a large amount of data, he must resort to the use of a dedicated hardware interception device rather then a standard device such as a personal computer for example. Furthermore, even if the eavesdropper did manage to process all of the intercepted data, he would not be able to make any sense of it.

According to a preferred embodiment of the present invention, a content enhanced packet of bit length l comprises an enhanced header of n bits and an enhanced payload of l minus n bits. The enhanced header is in clear format. The enhanced payload comprises two parts: a tag and a payload. The tag has a length of b bits and is preferably in encrypted format. Since the enhanced payload, comprising the tag and the payload, has a bit length of l minus n bits, the payload therefore has a bit length of l minus n minus b bits. The payload is preferably in encrypted format and comprises the content to be transmitted. According to one embodiment of the present invention the tag is based on the header of a standard data packet which would communicate the same content to be transmitted. In another embodiment the b bit tag is based on the first b bits of the payload of a standard data packet which would communicate the same content to be transmitted. Indeed, for the purpose of the invention, the goal is that the tag of the content enhanced packet could be any value which does not coincide with the value of tag of a stuffing enhanced packet.

A stuffing enhanced packet, also of bit length l bits, has an enhanced header of n bits, which is also in clear format, and an enhanced payload of l minus n bits. The enhanced payload also comprises a tag, preferably in encrypted format, of bit length b bits, however in this case, the payload of l minus n minus b bits is preferably based on a pseudo-random number or may be based on any other data since it will be ignored by authorized receivers. The structure of the stuffing enhanced packet is the same as the structure of the content enhanced packet.

The creation of a stuffing enhanced packet, according to an embodiment of the present invention may be described in two parts. First there is the preparation of the tag then there is an encryption. For the preparation of the tag, the transmission entity has knowledge of an efficient probabilistic algorithm, Sample( ) which returns a random string from a predetermined subset, S, of strings of digital data. The reception entity has knowledge of an efficient algorithm, Test(x), which returns (with a high probability) a value of 1 if x is a member of the subset S and returns a 0 if x is not a member of the subset S. In other words, the transmission entity can select a code from a predetermined subset of codes, which an authorized reception entity can test to determine whether the code came from the predetermined subset or not. Whether or not a code is tested as belonging to the predetermined subset indicates whether the associated enhanced packet should be discarded or not. Such algorithms are related to the domain of combinatorial property testing. Applications of this have been made in the fields of Learning Theory, Coding Theory and Complexity Theory, as described by Avrim Blum, Adam Kalai, Hal Wasserman in "Noise-tolerant Learning, the Parity Problem, and the Statistical Query Model" in Journal of the ACM 50(4): 506-519, 2003, and by Dana RON in "Handbook on Randomization, Volume II, 2001, Property Testing". A simple example of a suitable subset S is a random linear code of length b and rank strictly less than b, wherein code words have at least B errors for some fixed B. For a good choice of B, the reception entity can efficiently test that the word received belongs to S, for example using parity-check equations. This task is unfeasible for a third party which does not know S, as showed in "On Lattices, Learning with Errors, Random Linear Codes, and Cryptography" by Oded Regev in the Symposium on Theory of Computing, 2005, on pages 84-93.

The type of code described above is suitable for the present invention in the sense that the application of the algorithms Sample( ) and Test(x) are convenient and efficient. The encryption part requires that the transmission entity and the authorized reception entity both share knowledge of a secret key (K) of k bits in length (i.e. a secret bit-string of k bits) and knowledge of a block cipher (or cryptographic algorithm) using blocks of b bits of data and a k-bit key. The two algorithms Sample( ) and Test(x) and the description of the subset S are kept secret from unauthorized third parties. However, the choice of the block cipher need not be kept secret: if an unauthorized third party were to gain knowledge of the block cipher or the k-bit key, then thanks to the invention, the security of the transmission would not be compromised.

Another, more general way of describing the functions Sample( ) and Test( ) could be as follows: the Sample( ) function is the random choice of an element from a predefined subset of elements from within a larger set of elements; the Test( ) function is a test for whether or not a given element forms part of the predefined subset of elements. For example, there may exist a table listing all the elements of the subset; the Sample( ) function is equivalent to randomly choosing of one of those elements, while the Test( ) function is equivalent to searching the table for a given element.

Figure 3:
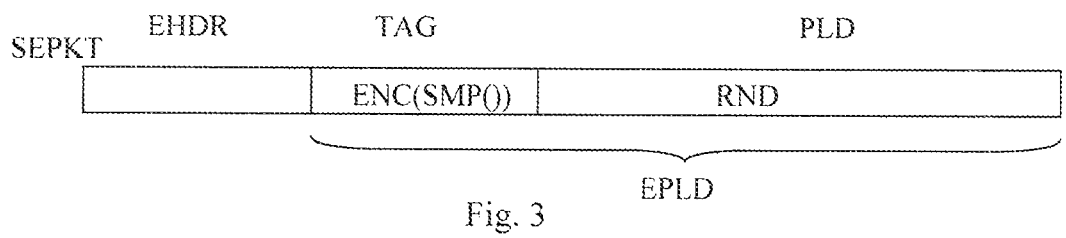
FIG. 3 showing details of the content of a first type of enhanced packet according to an embodiment of the present invention.

The staffing enhanced packets are created by the transmission entity. FIG. 3 shows an illustration of a stuffing enhanced packet. The enhanced header is constructed such that it looks like the header of a standard content packet. For example, the header could be identical to the header of a previously transmitted content enhanced packet. The actual details of the construction of a header depend on the specification of a legitimate header according to the system in question. The main point is that the header must not give any indication as to whether the enhanced payload comprises content information or stuffing information. In a transport stream comprising stuffing enhanced packets then, since the headers of these packets are copied from content enhanced packets, it is likely that many packets exist with identical headers. In order not to allow a third party to guess where the content enhanced packet is within the plurality of packets having identical headers, it is convenient to arrange for the order of packets to vary such that the content enhanced packet does not appear systematically at the same position within the plurality of packets.

Figure 4:
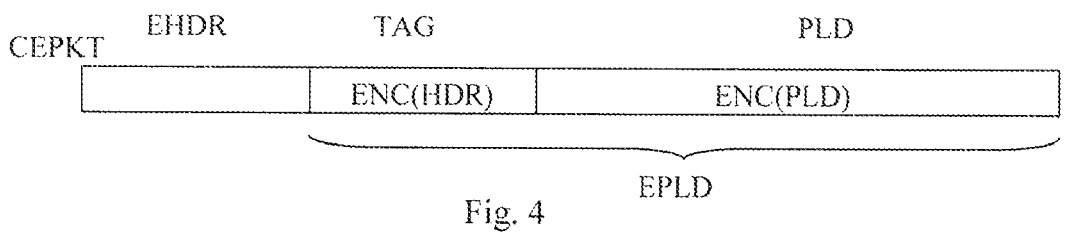
FIG. 4 showing details of the content of a second type of enhanced packet according to an embodiment of the present invention.

The enhanced payload of a stuffing enhanced packet is constructed in four steps:
  the function Sample( ) is called to determine a value x of b bits in length;
  the value x is encrypted using the block cipher under the key (K), giving ($Enc_K(x)$);
  the first b bits of the enhanced payload are set to the encrypted value of x (in other words the tag is set to ($Enc_K(x)$));
  the l minus n minus b remaining bits of the enhanced payload are set to a pseudorandom value The content enhanced packets are also created by the transmission entity. A content enhanced packet is illustrated in FIG. 4. The header is constructed in the same way as above. The enhanced payload of a content enhanced packet is actually based on a corresponding standard content data packet, including its header and its payload.

The tag, i.e. the first b bits, is generated by encrypting the b bits of the corresponding standard content packet using the block cipher and the k-bit key. The remaining l minus n minus b bits of the enhanced payload may also be generated by encrypting the payload using the block cipher and the k-bit key. The encryption may be done by using the cipher in CBC mode (Cipher Block Chaining).

Upon reception of a packet, the reception entity decrypts the tag of the enhanced packet, i.e. the first b bits of the enhanced payload, using the block cipher (i.e. $Enc_K^{-1}(b)$).

The reception entity then applies the algorithm Test(x) on the decrypted tag. If the result obtained is 1, then the enhanced packet is recognised as a stuffing enhanced packet and the packet is discarded. If the result is 0, then the packet is recognised as a content enhanced packet and the payload is decrypted using the block cipher. An encrypted transport stream is decrypted when the content enhanced packets comprised therein are decrypted and assembled to form a decrypted transport stream.

Examples of parameters which may be used in a preferred embodiment of the present invention to give a sufficiently high probability of correctly detecting stuffing packets by an authorized reception entity are as follows:
Packet length, l=1536 bits;
Header length, n=64 bits;
Block length (tag length), b=128 bits;
Payload of stuffing enhanced packets: pseudo-random value;
Block cipher: AES-128 (Advanced Encryption Standard) (i.e. with b=k=128) used in CBC mode;
Subset, S: codeword of length 128 bits from a linear code of dimension 64 with a bounded number of errors; recognition based on detecting that the number of errors is below the bound.

With the latter choice of efficiently samplable and testable subset, S, the problem of recognition of stuffing enhanced packets for an eavesdropper who knows the block cipher and the key is related to the Learning With Errors (LWE) computational problem, which is disclosed in the report "On Lattices, learning with errors, random linear codes, and cryptography" by Oded Regev in the Symposium on Theory of Computing, 2005, on pages 84-93.

In yet another embodiment of the present invention, instead of using the algorithms Sample( ) and Test(x), the transmission entity generates a list of codes that are deemed to be useful as markers in that the probability of such codes appearing as a tag in a content enhanced packet is negligibly small. In this embodiment, the transmission entity communicates its list of codes to authorized reception entities. The transmission entity then selects codes from the generated list, encrypts the codes and uses the encrypted codes as tags to mark stuffing enhanced packets before including them in a transmission. Since the authorized reception entities have knowledge of currently valid encryption keys, they may generate at a given time a valid list of encrypted tags and, by simple comparison of the received incoming encrypted tags, can efficiently detect and reject stuffing enhanced packets.

Different methods may be used to minimise the probability of one or more of the codes selected to generate tags coinciding with a cods which may actually appear in the first b bits of a payload. For example, it could be determined that the first b bits of a payload only cover a certain range, in which case the codes used for the tag would come from outside of that range. However, it may still be possible for a collision to occur, a collision meaning an instance where the first b bits of a payload are equal to one of the values selected to be usable in generating a tag. If a payload like this exists, then the reception entity will wrongly reject the packet as being a stuffing packet. According to an alternative embodiment of the present invention, the transmission entity is able to predict a collision by systematically comparing the first b bits of all payloads with all members of the subset of codes used in generating tags. Statistical information may be kept related to the number of collisions thus found with a view to continuously improving the quality of the set of codes used for creating tags. If the length b is selected to be sufficiently large, then the probability of such collisions appearing is very small and the consequence of a reception entity wrongly rejecting a packet negligible, however with such a prediction mechanism deployed in the system ongoing improvements in the quality of the tag subset are possible. Rather than merely providing statistics, the subset of codes could simply be continuously updated by removing each code which is detected to have caused a collision.

The invention claimed is:

1. A computer based method for creating an enhanced data stream from a transport stream comprising a plurality of standard data packets each having a header and a payload, said enhanced data stream comprising a plurality of stuffing enhanced packets and at least one content enhanced packet, the stuffing enhanced packets and the at least one content enhanced packet each having a header and an enhanced payload, the header of the at least one content enhanced packet being indistinguishable from the headers of the stuffing enhanced packets, said method comprising:
  generating, in a processor, the stuffing enhanced packets, each stuffing enhanced packet having an enhanced header and an enhanced payload, wherein the enhanced header is not distinguishable from a header of a standard data packet and wherein a first number of bits of the enhanced payload includes a first tag based on a random code selected from a predetermined subset of codes;
  generating, in the processor, the at least one content enhanced packet comprising an enhanced header and an enhanced payload, wherein the enhanced header is not distinguishable from a header of one of the plurality of standard data packets and wherein the enhanced payload is based on at least the payload of a standard data packet, wherein its first number of bits comprises a second tag which is not based on a code selected from the predetermined subset of codes;
  wherein a test is used by a reception entity to determine whether or not the first tag is based on a random code selected from the predetermined subset of codes, the test being unavailable to an unauthorized third party; and
  creating, in the processor, the enhanced data stream by assembling the stuffing enhanced packets and the content enhanced packet,
  wherein said stuffing enhanced packets outnumber said at least one content enhanced packet.

2. The method according to claim 1, in which the first tag of the at least one content enhanced packet is based on the header of one of the plurality of standard data packets.

3. The method according to claim 1, in which all or part of the enhanced data stream is encrypted using a key.

4. The method according to claim 1, wherein said stuffing enhanced packets are included at random positions within the enhanced data stream.

5. The method according to claim 1, wherein the predetermined subset of codes is updated, said method further comprising:
  comparing the value of the first tag with part of the payload of the standard data packet; and
  removing the value of the first tag from the predetermined set of values.

6. A computer-based method for creating a transport stream from an enhanced data stream comprising at least one stuffing enhanced packet and at least one content enhanced packet, the at least one stuffing enhanced packet and the at least one content enhanced packet each having a header and an enhanced payload, the header of the at least one content enhanced packet being indistinguishable from the header of the at least one stuffing enhanced packet, said transport stream comprising at least one standard data packet having a header and a payload, said method comprising:
- assembling the transport stream by selecting enhanced packets from the enhanced data stream for which at least part of the enhanced packet's enhanced payload corresponds to a value from a predetermined subset of codes, a first number of bits of each enhanced payload being encrypted under a key; and
- decrypting the first number of bits using the key before testing using a test to determine whether or not the first tag is based on a random code selected from the predetermined subset of codes, the test being unavailable to an unauthorized third party.

7. The method according to claim 1, wherein transmission of the enhanced data stream requires an available bandwidth, the stuffing enhanced packets being used to occupy the available bandwidth.

8. The method according to claim 1, wherein the transport stream comprises digital multimedia content.

9. A transmission entity for constructing stuffing enhanced packets and content enhanced packets comprised in an enhanced data stream, said stuffing enhanced packets outnumbering said content enhanced packets, said construction based on a transport stream comprising at least one standard data packet having a header and a payload, said stuffing enhanced packets and said content enhanced packets each having a header and an enhanced payload, the headers of the content enhanced packets being indistinguishable from the headers of the stuffing enhanced packets, said transmission entity comprising:
- a processor; and
- a memory connected to the processor;
- wherein the processor is adapted to:
  - generate each stuffing enhanced packet having a first tag based on a code selected from a predetermined subset of codes, the first tag being a first number bits of the enhanced payload of the stuffing enhanced packet; and
  - generate each content enhanced packet having a second tag which is not based on a code selected from the predetermined subset of codes, the second tag being a first number of bits of the enhanced payload of the content enhanced packet, the enhanced payload of the content enhanced packet being further based on at least the payload of one from the plurality of standard data packets, wherein a test is used by a reception entity to determine whether or not the first tag is based on a random code selected from the predetermined subset of codes, the test being unavailable to an unauthorized third party.

10. A reception entity for detecting and discarding stuffing enhanced packets within an enhanced data stream to produce a transport stream, the enhanced data stream comprising a plurality of stuffing enhanced packets and at least one content enhanced packet, said stuffing enhanced packets outnumbering said content enhanced packets, the stuffing enhanced packets and the at least one content enhanced packet each having a header and an enhanced payload, the header of the at least one content enhanced packet being indistinguishable from the headers of the stuffing enhanced packets, said transport stream comprising at least one standard data packet having a header and a payload, said reception entity comprising: a processor; and a memory connected to the processor; wherein the processor is adapted to:
- test a first number of bits of the enhanced payload to determine whether or not said the first number of bits correspond to a value from a predetermined subset of codes, the test configured to determine whether or not the tag is based on a random code selected from the predetermined subset of codes, the test being unavailable to an unauthorized third party; and
- create the transport stream by discarding enhanced packets within the enhanced data stream for which said test produces a match.

11. A system for communication of digital multimedia content, the system comprising:
- the transmission entity for constructing stuffing enhanced packets and content enhanced packets comprised in an enhanced data stream, said stuffing enhanced packets outnumbering said content enhanced packets, said construction based on a transport stream comprising at least one standard data packet having a header and a payload, said stuffing enhanced packets and said at least one content enhanced packet each having a header and an enhanced payload, the header of the content enhanced packet being indistinguishable from the headers of the stuffing enhanced packets, said transmission entity comprising:
  - a processor; and
  - a memory connected to the processor;
  - wherein the processor is adapted to:
    - generate each stuffing enhanced packet having a first tag based on a code selected from a predetermined subset of codes, the first tag being a first number bits of the enhanced payload of the stuffing enhanced packet; and
    - generate the at least one content enhanced packet having a second tag which is not based on a code selected from the predetermined subset of codes, the second tag being a first number of bits of the enhanced payload of the at least one content enhanced packet, the enhanced payload of the at least one content enhanced packet being further based on at least the payload of one from the plurality of standard data packets; and
- a reception entity for detecting and discarding stuffing enhanced packets within an enhanced data stream to produce a transport stream, said reception entity comprising:
- a processor; and
- a memory connected to the processor;
- wherein the processor is adapted to:
  - test a first number of bits of the enhanced payload to determine whether or not said the first number of bits correspond to a value from a predetermined subset of codes; and
  - create the transport stream by discarding enhanced packets for which said test produces a match,
- wherein the transmission entity and the reception entity are configured to perform said communication of digital multimedia content via a data channel, wherein a test is used by the reception entity to determine whether or not the tag is based on a random code selected from the predetermined subset of codes, the test being unavailable to an unauthorized third party.

* * * * *

UNITED STATES PATENT AND TRADEMARK OFFICE
CERTIFICATE OF CORRECTION

PATENT NO.        : 9,131,113 B2
APPLICATION NO.   : 13/286536
DATED             : September 8, 2015
INVENTOR(S)       : Jean-Philippe Aumasson et al.

It is certified that error appears in the above-identified patent and that said Letters Patent is hereby corrected as shown below:

On the Title Page, Item (54) and in the Specification, Column 1,
Change "Method for Creating an Enhanded Data Stream" to --Method for Creating an Enhanced Data Stream--

Signed and Sealed this
Twenty-ninth Day of March, 2016

Michelle K. Lee
*Director of the United States Patent and Trademark Office*